US008761085B2

(12) United States Patent
Mizukoshi

(10) Patent No.: US 8,761,085 B2
(45) Date of Patent: Jun. 24, 2014

(54) PROXY MOBILE IP SYSTEM, ACCESS GATEWAY AND METHOD FOR DETERMINING THE ORDER OF REGISTRATION NOTIFICATION MESSAGES USED THEREFOR

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 955 days.

(21) Appl. No.: 12/676,566

(22) PCT Filed: Sep. 4, 2008

(86) PCT No.: PCT/JP2008/065974
§ 371 (c)(1),
(2), (4) Date: Mar. 4, 2010

(87) PCT Pub. No.: WO2009/031617
PCT Pub. Date: Mar. 12, 2009

(65) Prior Publication Data
US 2010/0208657 A1    Aug. 19, 2010

(30) Foreign Application Priority Data

Sep. 5, 2007   (JP) ................................. 2007-229629

(51) Int. Cl.
*H04W 4/00*         (2009.01)
(52) U.S. Cl.
USPC .......................................... 370/328; 370/401
(58) Field of Classification Search
None
See application file for complete search history.

(56) References Cited

U.S. PATENT DOCUMENTS

| 7,701,896 | B1* | 4/2010 | Chowdhury et al. | ......... 370/328 |
| 2008/0095119 | A1* | 4/2008 | Bachmann et al. | ......... 370/332 |
| 2008/0182576 | A1* | 7/2008 | Tsirtsis et al. | ............ 455/435.1 |

FOREIGN PATENT DOCUMENTS

JP    8-274812 A    10/1996

OTHER PUBLICATIONS

International Search Report for PCT/JP2008/065974 mailed Sep. 30, 2008.
S. Gundavelli et al., "Proxy Mobite IPv6 draft-ietf-netlmm-proxymip6-01.txt", NETLMM WG, Internet-Draft, Jun. 18, 2007, pp. 1-49, <http://www.ietf.org/internet-drafts/draft-ietf-netlmn-proxymip6-0.1.txt>.
"[netlmm] Issue: Timestamp vs Sequence Number based logic", Internet, extracted Jul. 5, 2007, <http://www1.ietf.org/mail-achive/web/netlmn/current/msg02106,html>.

* cited by examiner

*Primary Examiner* — Kevin C Harper
*Assistant Examiner* — Samina Choudhry
(74) *Attorney, Agent, or Firm* — Sughrue Mion, PLLC

(57) ABSTRACT

In a proxy mobile IP system, a mobility anchor comprises: a proxy mobile IP registration unit effectuating proxy mobile IP registration in proxy mobile IP (Internet Protocol) communication by one or more registration notification messages from an access gateway; and a last registration time recording/management unit effectuating recording and management of time of last registration by the registration notification message. The mobility anchor, on receipt of a new registration notification message, determines, in case a receipt time difference (or a receipt time interval) between the time of receipt of the new registration notification message and a registration notification message recorded last time in the last registration time recording/management unit is within a pre-set period of time, and the access gateway has changed by switching, possibility of order reversal of the new registration notification message and the registration notification message recorded last time.

12 Claims, 7 Drawing Sheets

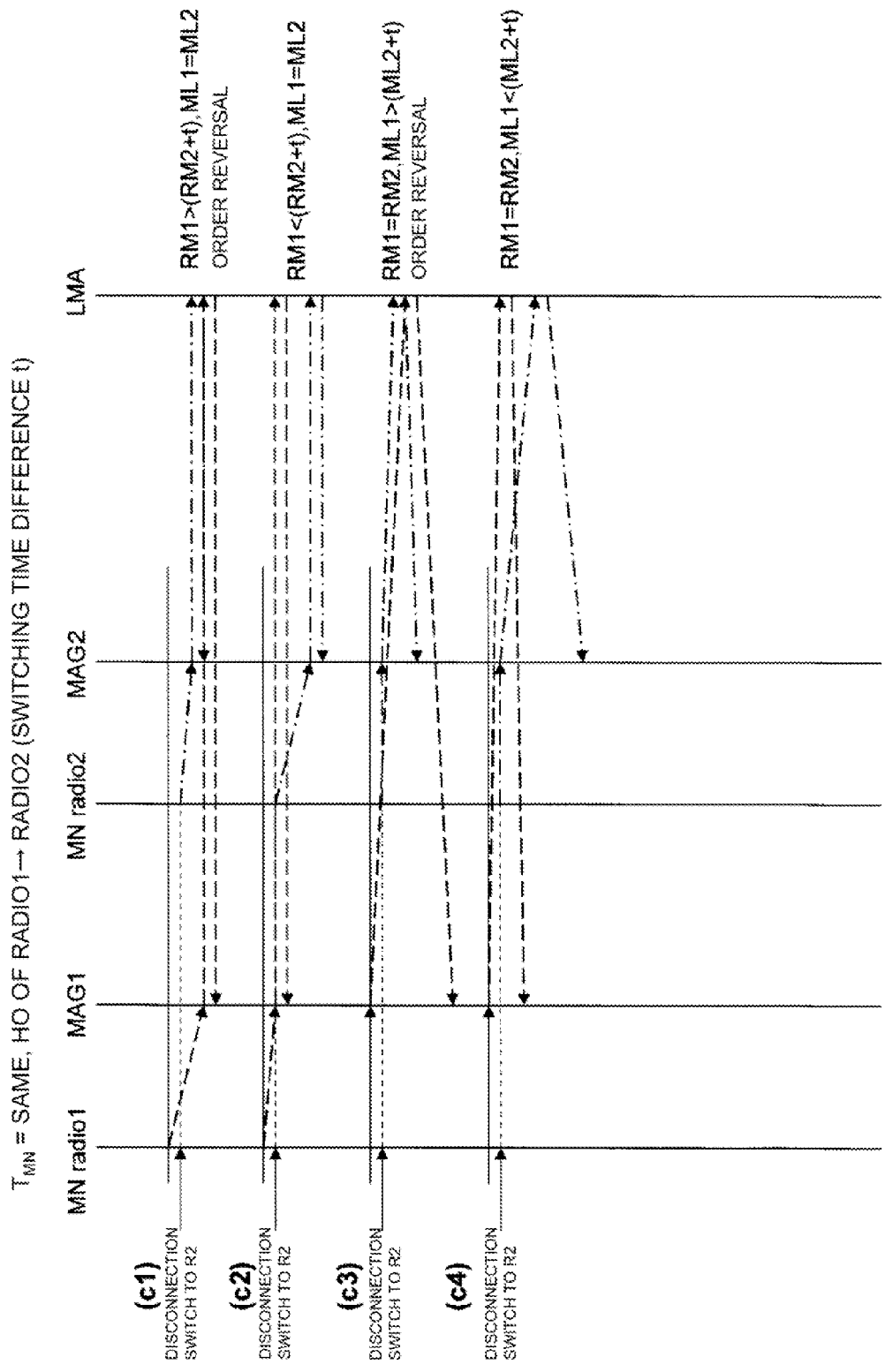

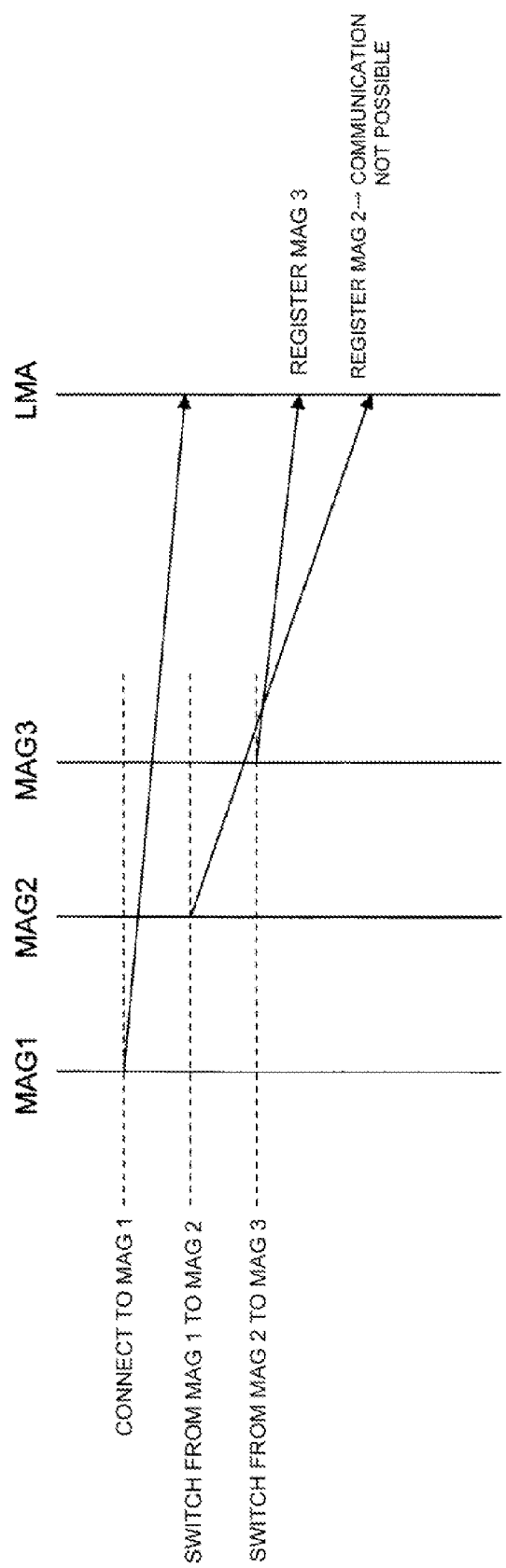

US 8,761,085 B2

PROXY MOBILE IP SYSTEM, ACCESS GATEWAY AND METHOD FOR DETERMINING THE ORDER OF REGISTRATION NOTIFICATION MESSAGES USED THEREFOR

DESCRIPTION OF RELATED APPLICATIONS

The present application is the National Phase of PCT/JP2008/065974, filed Sep. 4, 2008, which claims priority rights of the Patent Application No. 2007-229629, filed in Japan on Sep. 5, 2007. The total disclosure of this patent application of the senior filing data are to be incorporated herein by reference.

TECHNICAL FIELD

This invention relates to a proxy mobile IP system, an access gateway and a mobility anchor, and also to a method for determining the order of registration notification messages used therefor. More particularly, it relates to a proxy mobile IP system that determines the order of the registration notification messages for proxy mobile IP (Internet Protocol) communication that performs mobile terminal location management over a communication network.

BACKGROUND

So far, a separate movement management control system has been used from one mobile phone network system to another. Nowadays, it is contemplated to render possible the application of IP in the inter-conversion among different packet networks of respective systems. In addition, such a system that allows for interoperability among different radio network mediums has been a desideratum.

It is thus contemplated to implement such system of interoperability in accordance with a proxy mobile IP system now being standardized by IFTF (Internet Engineering Task Force) for a movement management control system such as a mobile phone network or the WiMAX (Worldwide Interoperability for Microwave Access) network.

FIG. 4 schematically shows an example configuration of the system according to the proxy mobile IP system. Referring to FIG. 4, the system is composed of an MN (Mobile Node) 5, a MAG (Mobile Access Gateway) (1) 6-1, a MAG (Mobile Access Gateway) (2) 6-2 and an LMA (Localized Mobility Anchor) 7. The MN 5 may have communication via a radio communication domain Radio 1 and further connects to the LMA 7 over the MAG (1) 6-1. The MN 5 also may have communication via a radio communication domain Radio2, and further connects to the LMA 7 over the MAC; (2) 6-2.

With the mobile IP system, a mobile terminal registers a care of address(oA), which is dependent on the network of the movement destination, in a home agent, using a registration notification message. The home agent sends an IP packet, addressed to a home address of the mobile terminal, to the care of address.

However, in applying the mobile IP system to a mobile phone network, there is raised a problem that, since the mobile terminal needs to possess a mobile IP control function, it is not possible to perform the movement management of the mobile terminal not having the mobile IP control function. There is also raised a problem that, in the collocate care of address (CCoA) system of IPv4 (Internet Protocol version 4) or in the IPv6 (Internet Protocol version 6) system, the IP encapsulation communication is needed in the domain of the radio communication, thus wasting the radio resource in an amount corresponding to the IP header.

The proxy mobile IP system is now under study in order to meet a demand that, even though the control protocol of the mobile IP system is used, no special function is required of the mobile terminal, such that IP encapsulation communication is unnecessary in the radio communication domain. Specified systems therefor are disclosed in Non-Patent Document 1 indicated below.

The proxy mobile IP system operates as follows: A mobile access gateway (MAG) is placed intermediate between a home agent and a mobile terminal. When the MAG has detected that the mobile terminal has moved into an area of an access network under the MAG's control, the MAG performs registration, on behalf of the mobile terminal, in a home agent, in accordance with the proxy mobile IP system. An IP address of the MAG is used at this time as a care of address.

An IP packet, addressed to the home address of the mobile terminal, is transmitted from the home agent to the MAG, using IP encapsulation communication established between the home agent and the MAG. This MAG takes out the IP packet, addressed to the mobile terminal, and transmits the so taken out IP packet to the mobile terminal, using a radio link communication means between the MAG and the mobile terminal.

In handover processing, performed when the mobile terminal has moved to an area of another new MAG, the new MAG detects such movement of the mobile terminal and performs registration in the home agent in accordance with the proxy mobile IP system. Since this proxy mobile IP system is such a one in which different MAGs perform the registration on behalf of the mobile terminal, there exists a plurality of sources of transmission of the registration notification messages.

Because of differential transmission delays between the respective MAGs and the home agent, there are cases where the order of the registration notification messages from the old and new MAGs is reversed when the messages arrive at the home agent. In a known manner, there persists a problem that, when the registration notification message from the old MAG has arrived at a belated timing, the IP packet is not sent to the new MAG.

In the mobile IP system, the mobile terminal appends a sequential number to the registration notification message to avoid the problem of order reversal. However, in the proxy mobile IP system, in which the scheme of global sequential number management may not be implemented, there persists the problem of order reversal.

Several solutions to overcome the problem of order reversal of registration notification messages are under study by the NETLMN WG (Network-based Localized Mobility Management Working Group) of IFTF (refer to FIG. 5). In Non-Patent Document 2, indicated below, there are proposed five concrete solutions:

According to the first solution, a plurality of MAGs is synchronized with one another, using a time server, and the timing information is appended to the respective registration notification messages. A home agent performs order decision based on the timing information entered in the registration notification messages. This solution suffers a problem that synchronization to high accuracy is necessary.

According to the second solution, it is detected whether or not a registration notification message from an old MAG arrives within a predetermined time as from end of processing of the registration notification message from a new MAG. Only the first request from the old MAG is discarded. This solution suffers a problem that it depends on timer re-send processing of the old MAG, and hence the processing is protracted, and another problem that a registration notification message from a new MAG, if any, is prioritized.

According to the third solution, the problem of the second solution that it depends on the timer re-send processing of the old MAG is to be overcome. It is thus detected whether or not a registration notification message from an old MAG arrives within a predetermined time after processing a registration notification message from a new MAG. The home agent returns explicitly an error only for the first time. The old MAG performs the registration again if a mobile terminal is connected to it under its control. This third solution suffers a problem that, if the registration notification message has arrived from the new MAG, it is prioritized.

According to the fourth solution, a new MAG performs initial registration when it has established a radio link and performs processing again after it has succeeded in the initial registration. That is, the MAG sends the registration notification message twice. This solution suffers a problem that excess registration packets are necessary.

According to the fifth solution, a home agent returns an error in response to an initial registration notification message from a new MAG. At the same time, the home agent alerts a correct sequence number to the new MAG, which new MAG again performs registration using the correct sequential number. This fifth solution suffers a problem that excess registration packets are necessary.

Referring to FIG. 7, if a registration request is made from MAG 1 and MAG 2, an IP tunnel is formed between the MAG and the LMA, as a result of the registration request, and an IP packet is encapsulate and transmitted. The IP packet, transmitted encapsulated from the LMA, is decapsulated by the MAG and transferred to the mobile terminal (MN). A packet from the mobile terminal gets to the LMA by the reverse of the sequence to that described above.

[Non-Patent Document 1] "Proxy Mobile IPv6 draft-ietf-netlmm-proxymip6-0.1.txt" (NETLMM WG, Jun. 19, 2007) (http://www.ietforg/intemet-drafts/draft-ietf-netlmn-proxymip6-0.1.txt)

[Non-Patent Document 2] "[netlmn] Issue:Timestamp vs Sequence Number based logic" (http://www1.ietf.org/mail-achive/web/netlmn/current/msg02106.html)

SUMMARY

The disclosures of the Non-Patent Documents 1 and 2 are to be incorporated herein by reference. The following analysis is made by the present invention.

In the proxy mobile IP system, relevant to the present invention, the home agent is unable to determine the order of the registration notification messages as sent from the MAGs. Hence, the late arriving registration notification message is processed last and registered for addressing to the old MAG Hence, with the proxy mobile IP system, relevant to the present invention, different propagation delays are caused on respective transmission paths from a plurality of MAGs to the home agent when handover of a mobile terminal between a plurality of MAGs occurs through movement of mobile terminals. If the propagation delay between the new MAG and the home agent is longer than a propagation delay between an old MAG and the home agent by a time difference caused in the respective MAGs in sending their registration notification messages, the mobile terminal, moved into an area of the new MAG, becomes unable to have communication (see FIG. 6).

FIG. 6 shows possible occurrences of order reversal of the registration notification messages for a switching time difference t between radio communication domains Radio1 and Radio2, the transmission time RM1 between the radio communication domains Radio1 and MAG 1, the transmission time RM2 between the radio communication domain Radio2 and the MAG 2, the transmission time ML1 between the MAG 1 and the LMA and for the transmission time ML2 between the MAG 2 and the LMA.

Initially, the MN is under communication over the radio communication domain Radio1 and, after time t, begins communication over the radio communication domain Radio2. A pattern c1 shows that, if the transmission time RM1 between the radio communication domain Radio1 and the MAG 1 is longer than a sum of the transmission time RM2 between the radio communication domain Radio2 and the MAG 2 and time t [RM1>(RM2+t), ML1=ML2], an order reversal between the two registration notification messages occurs.

A pattern c2 shows that, since the transmission time RM1 between the radio communication domain Radio1 and the MAG 1 is shorter than the sum of the transmission time RM2 between the radio communication domain Radio2 and the MAG 2 and time t [RM1<(RM2+t), ML1=ML2], there occurs no order reversal between the two registration notification message.

A pattern c3 shows that, if the transmission time ML1 between the MAG 1 and the LMA is longer than the sum of the transmission time ML2 between the MAG 2 and the LMA [RM1=RM2, ML1>(ML2+t)], the order reversal between the two registration notification messages occurs.

A pattern c4 shows that, since the transmission time ML1 between the MAG 1 and the LMA is shorter than the sum of the transmission time ML2 between the MAG 2 and the LMA and time t [RM1=RM2, ML1<(ML2+t)], there occurs no order reversal between the two registration notification messages.

It should be noted that, if the MAG 1 and the MAG 2 are correctly synchronized to each other, order reversal of the registration notification messages with the pattern c3 can be detected, however, that with the pattern c1 can not be detected.

In the proxy mobile IP system, relevant to the present invention, the timer processing is carried out after the MAG address is updated. Thus, if a registration notification message is from a MAG new for the LMA, such message is registered preferentially. Hence, in case where switching is made to a third MAG and so forth in a short time, with the above described second and third solutions, if a transmission delay between the second MAG and the LMA is longer than that between the third MAG and the LMA, a mobile terminal, which has moved to the area of the third MAO, becomes unable to communicate (see FIG. 7).

It is therefore an object of the present invention to eliminate the above mentioned problems and to provide a proxy mobile IP system, an access gateway, a mobility anchor with which the problem of the order reversal of arrival of registration notification messages may be obviated even in a case where switching among three or more MAGs made in a short time. The present invention also contemplates providing a method for determining the order of registration notification messages used therefor.

In a first aspect of the present invention, there are provided a proxy mobile IP (Internet Protocol) system that determines order of registration notification messages by following elements, and component parts of the system. A mobility anchor includes a proxy mobile IP registration unit effectuating proxy mobile IP registration in the proxy mobile IP communication by a registration notification message from an access gateway. The mobility anchor also includes a last registration time recording/management unit recording and managing the time of last registration by the above mentioned registration notification message. If, when a new registration notification message is received, a time difference between a time of receipt of a new registration notification message and a time of receipt of a registration notification message recorded in the above mentioned last registration time recording/management unit (time difference of receipt of the registration notification messages) is less than a preset period of time, and switching has been made from one access gateway to another, the mobility anchor determines possibility of order reversal of the registration notification messages while the registration of the access gateway is maintained.

In a second aspect, the present invention provides a method for determining order of one or more registration notification messages in proxy mobile IP (Internet Protocol) communication by the following sequence or procedure. When a mobility anchor effectuates proxy mobile IP registration in proxy mobile IP (Internet Protocol) communication by a registration notification message from an access gateway, it records a time of receipt of a registration notification message. If, when a new registration notification message is received, a time difference between a time of receipt of the new registration notification message and a time of receipt of the registration notification message recorded in the above mentioned last registration time recording/management unit (receipt time interval of the registration notification messages) is less than a preset period of time, and switching has been made from one access gateway to another, the mobility anchor determines possibility of order reversal of the registration notification messages, while the registration of the access gateway is maintained.

In a third aspect, the present invention provides a proxy mobile IP system in which a mobile anchor has following units to determine order of registration notification messages from the access gateways in the proxy mobile IP (Internet Protocol) communication to perform location management of the mobile terminal over a communication network.

The mobility anchor includes a last registration time recording/management unit that records and manages a time of last registration by the above mentioned registration notification messages. The last registration time recording/management unit works in association with a proxy mobile IP registration unit that effectuates proxy mobile IP registration in the above mentioned proxy mobile IP communication by the above mentioned registration notification messages.

If, when the above mentioned registration notification message is received, a time difference between a time of receipt of a registration notification message and a time of receipt of the registration notification message received last time is less than a preset period of time, and switching has been made from one access gateway to another, the mobility anchor determines possibility of order reversal of the registration notification messages while the registration of the access gateway is maintained.

In a fourth aspect, the present invention provides a mobility anchor that is provided with the above mentioned time information recording/management unit and that determines the order reversal of the registration notification messages.

In a fifth aspect, the present invention provides a proxy mobile IP system in which the mobility anchor has following units to determine the order of the registration notification messages from the access gateway in the proxy mobile IP communication.

The mobility anchor is provided with a last registration time recording/management unit recording and managing the time of last registration on receipt of the corresponding registration notification message. The last registration time recording/management unit works in association with a proxy mobile IP registration unit to effectuate proxy mobile IP registration in the above mentioned proxy mobile IP communication by the above mentioned registration notification message.

If, when the above mentioned registration notification message is received, a time difference between a time of receipt of a registration notification message and a time of receipt of a registration notification message recorded last time in the above mentioned last registration time recording/management unit is less than a preset period of time, and switching has been made from one access gateway to another, the mobility anchor determines possibility of order reversal of the registration notification messages while the registration of the access gateway is maintained.

The meritorious effects of the present invention are summarized as follows.

With the present invention, having the above mentioned formulation and operation, such an advantage can be obtained that, even if switching is made among three or more MAGs in a short time, it is possible to obviate the problem of reversal of the arrival order of the registration notification messages.

BRIEF DESCRIPTION OF THE DRAWINGS

FIG. 6 is a schematic view for illustrating a proxy mobile IP system relevant to the present invention.

FIG. 7 is a schematic view for illustrating a problem of a certain solution with respect to the proxy mobile IP system relevant to the present invention.

PREFERRED MODES

Figure 1:
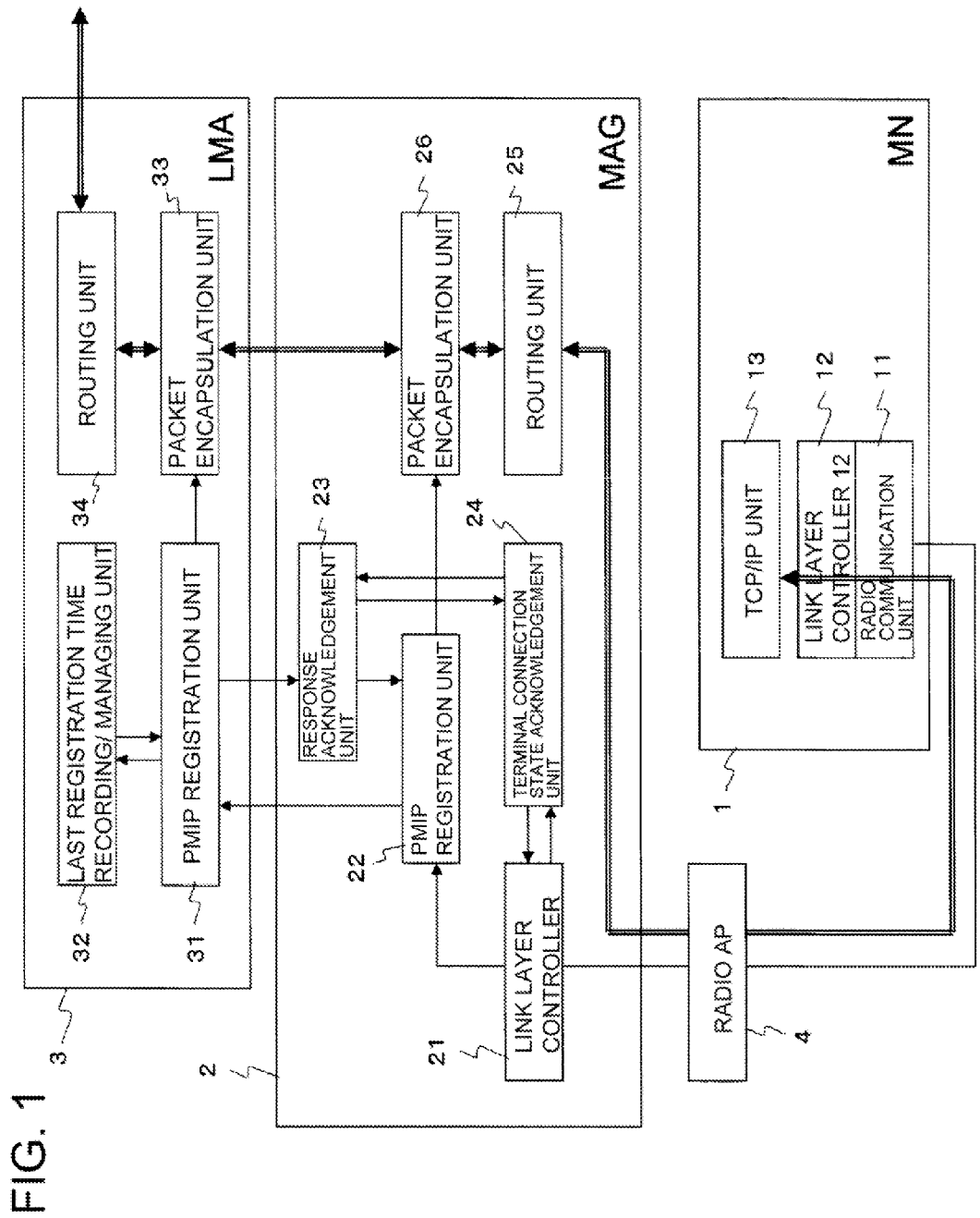
FIG. 1 is a block diagram showing an example configuration of a proxy mobile IP system according to an exemplary embodiment of the present invention.

An exemplary embodiment of the present invention will now be described with reference to the drawings. FIG. 1 depicts a block diagram showing an example formulation of a proxy mobile IP system according to an exemplary embodiment of the present invention. Referring to FIG. 1, a proxy mobile IP system of the present exemplary embodiment includes a MN (Mobile Node) 1, a MAG (Mobile Access Gateway) 2, a LMA (Localized Mobility Anchor) 3 and a wireless (radio) AP (Access Point) 4.

The MN 1 is made up of a radio communication unit 11, a link layer controller 12 and a TCP/IP (Transmission Control Protocol/Internet Protocol) unit 13.

The MAG 2 includes a link layer controller 21 and a PMIP (Proxy Mobile IP) registration unit 22 that performs proxy mobile IP registration in proxy mobile IP communication with a registration notification message, and a response acknowledgement unit 23 that acknowledges a response from the LMA 3. The MAG 2 also includes a terminal connection state acknowledgement unit 24 that detects the state of terminal connection of the mobile terminal (MN1). The MAG 2 further includes a routing unit 25 and a packet encapsulation unit 26.

The LMA 3 includes a PMIP registration unit 31 that performs Proxy mobile IP registration with a registration notification message, and a last registration time recording/managing unit 32 that records and manages the time of last registration by the registration notification message. The LMA 3 also includes a packet encapsulation unit 33 and a routing unit 34.

In the present exemplary embodiment, the link layer controller 21, PMIP registration unit 22 and the response acknowledgement unit 23 are extended to possess the terminal connection state acknowledgement unit 24. In addition, the PMIP registration unit 31 of the LMA 3 is extended to possess the last registration time recording/managing unit 32.

Figure 2:
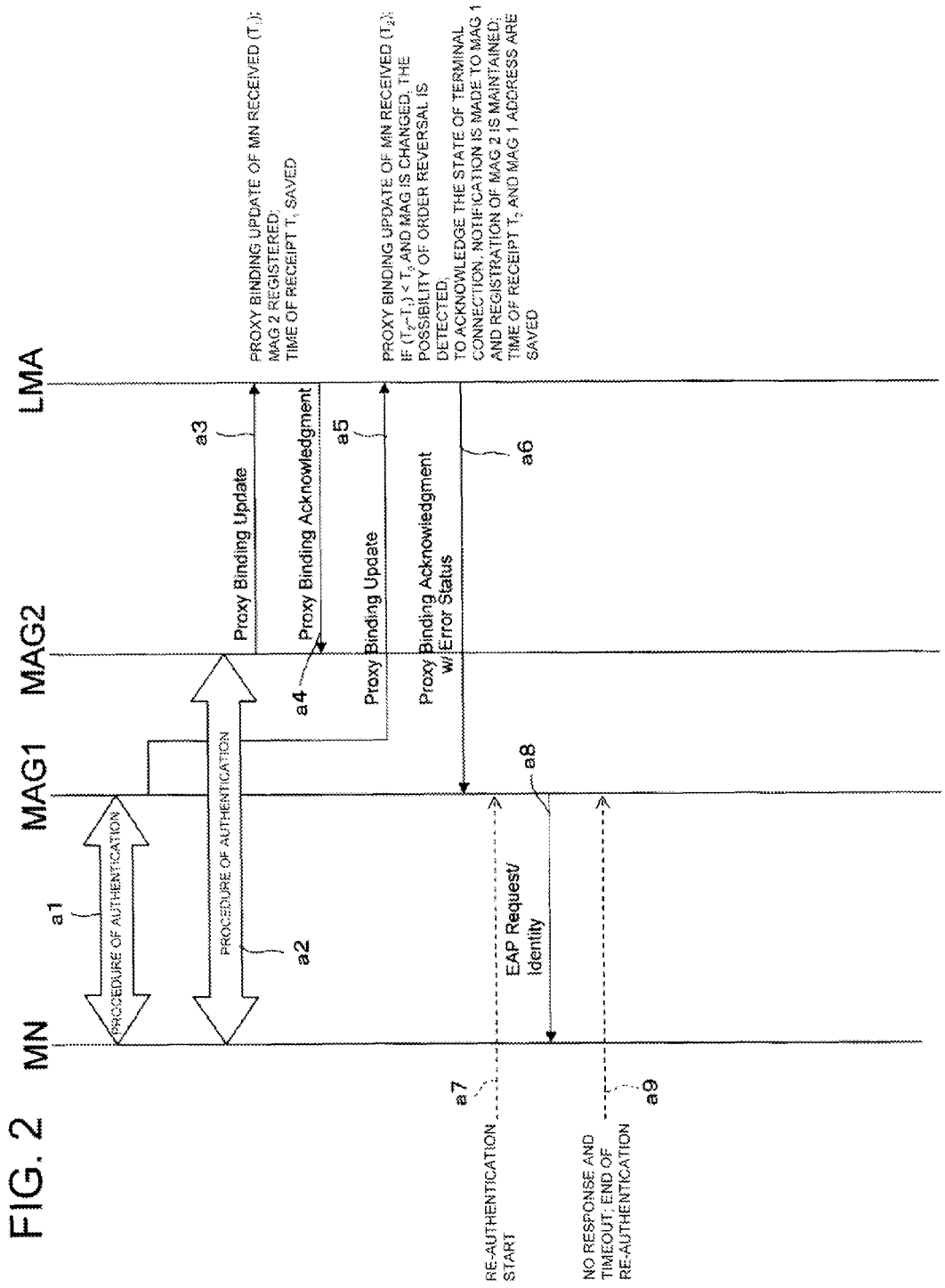
FIG. 2 is a sequence chart showing the processing for determining the order according to an exemplary embodiment of the present invention.
Figure 3:
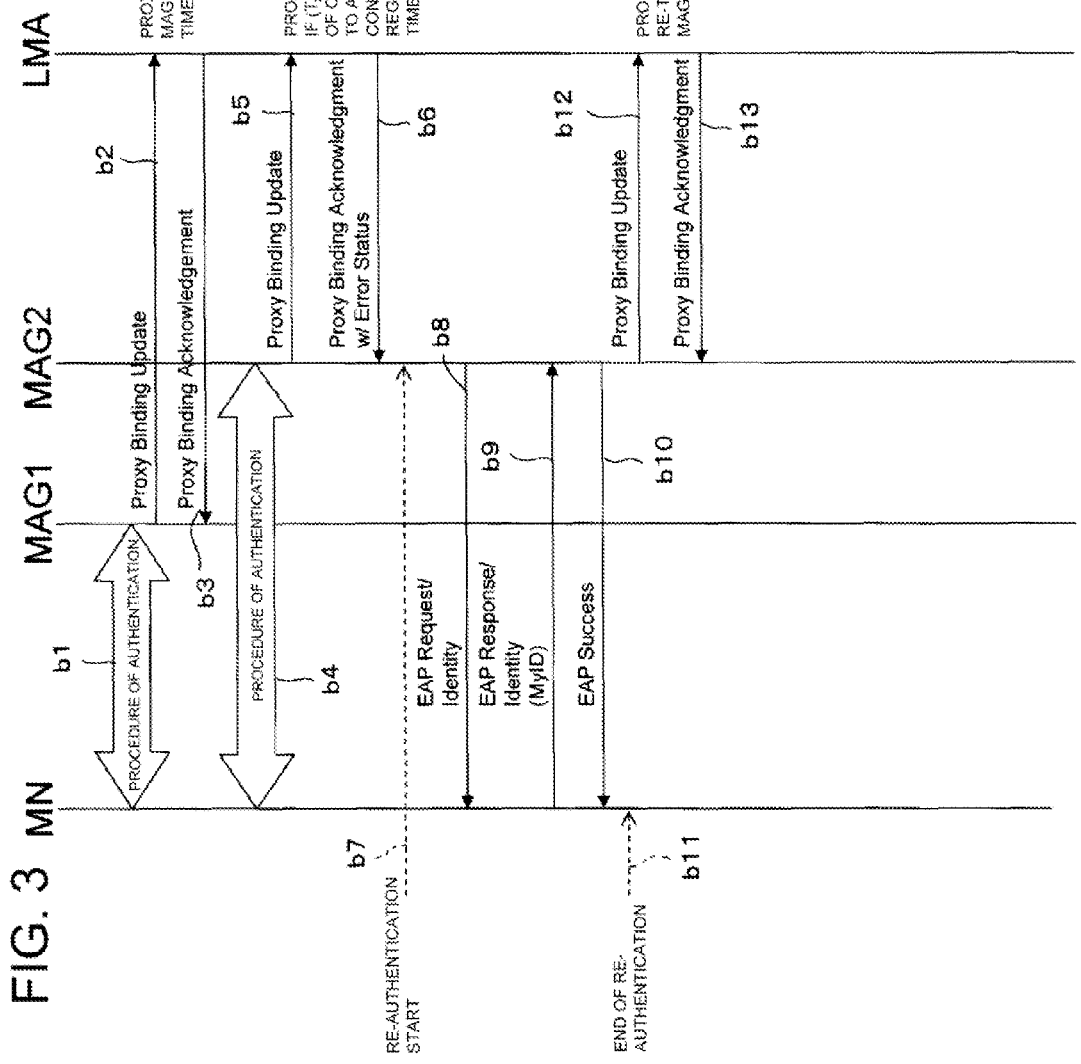
FIG. 3 is another sequence chart showing the processing for determining the order according to an exemplary embodiment of the present invention.

FIGS. 2 and 3 depict sequence charts showing the processing of order decision in the present exemplary embodiment of the present invention. FIG. 2 shows the processing for a case where order reversal of registration notification messages has occurred. The processing for connection, performed between the MN 1 and the MAG 2 using the pre-existing sequence for authentication, is here dispensed with.

Figure 4:
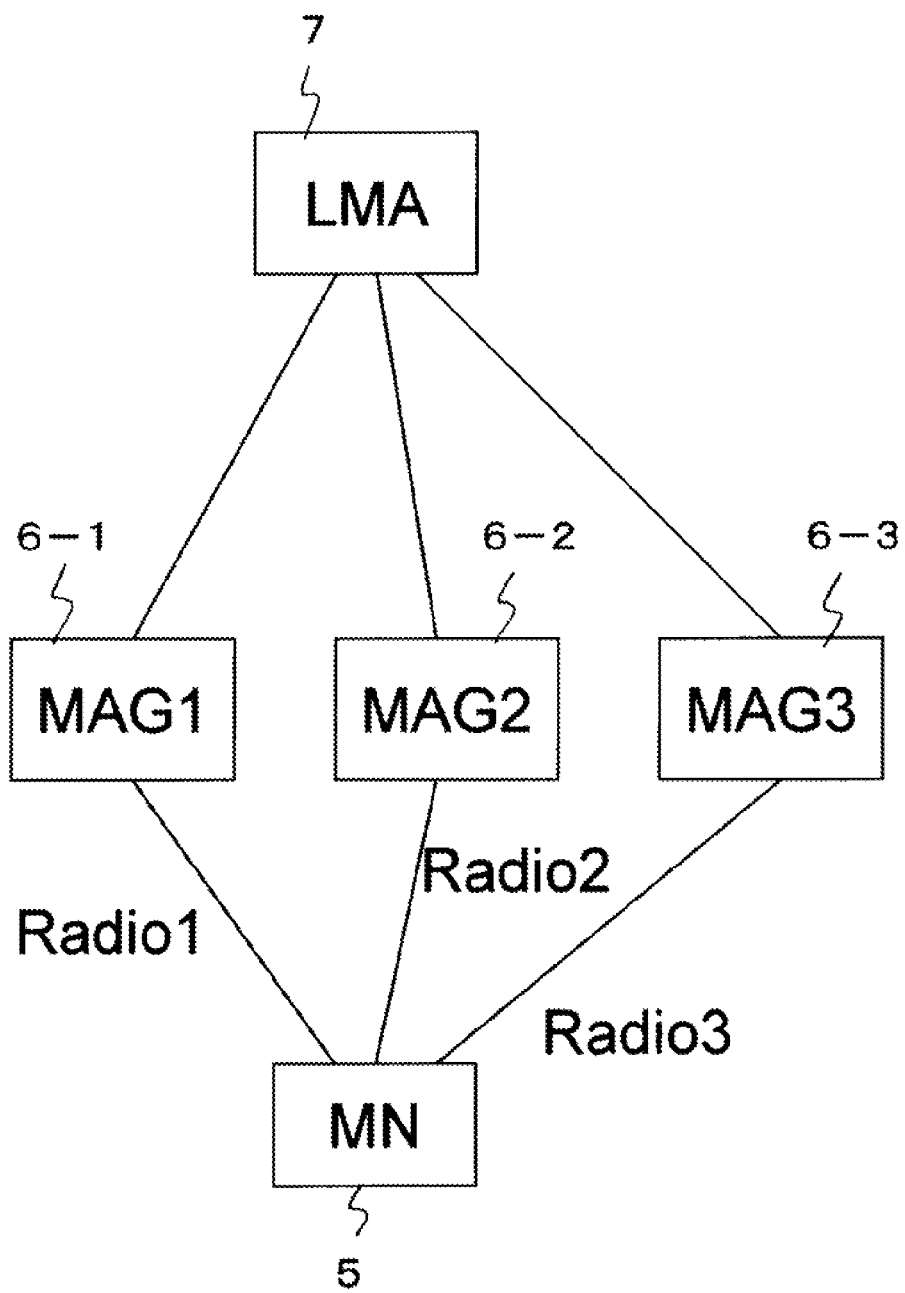
FIG. 4 is a block diagram showing an example configuration of a system of the proxy mobile IP system relevant to the present invention.
Figure 5:
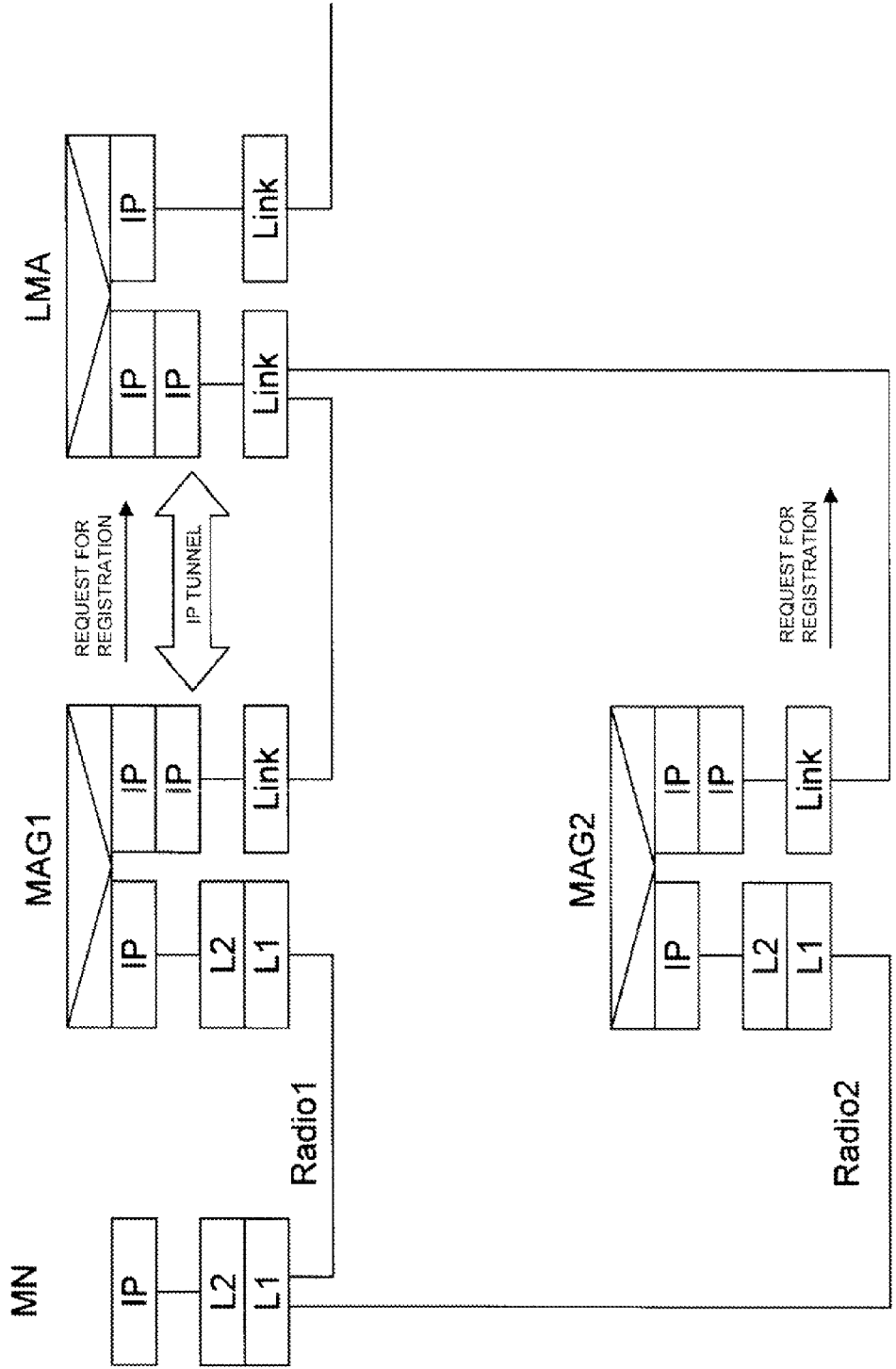
FIG. 5 is a schematic view showing a proxy mobile IP system relevant to the present invention.

In the proxy mobile IP system of the exemplary embodiment of the present invention, the MN 1, MAG 2, LMA 3 and the radio AP 4, described above, go to make up a system configuration similar to that of the proxy mobile IP system of FIG. 4, in a manner not shown in the drawings. The system of FIG. 4 is relevant to the system of the present invention. In the case of the present exemplary embodiment, two MAGs, one of which is shown as MAG 2, are referred to as MAG (1)2-1 and MAG (2)2-2.

After authentication of the MN 1 with the MAG (1)2-1 (a1 of FIG. 2), the MAG (1)2-1 routes Proxy Binding Update to the LMA 3 (a5 of FIG. 2). In a short time, the MN 1 breaks the connection between it and the MAG (1)2-1, and has authentication with the MAG (2)2-2. The MAG2 then routes the Proxy Binding Update to the LMA 3 (a3 of FIG. 2).

It is supposed that, due to the difference in the transmission delay between the MAG(1) 2-1 and the LMA 3 and that between the MAG(2) 2-2 and the LMA 3, the Proxy Binding Update from the MAG(2) 2-2 has reached the LMA 3 earlier. The LMA 3 then registers the MAG(2) 2-2 as an access gateway for the MN 1, and saves the time of receipt T1.

If the Proxy Binding Update from the MAG(1) 2-1 subsequently reached the LMA 3 at time T2, and the condition of the relation of the difference between the time of receipt T2 and the time of receipt T1 is less than T0, and the fact of MAG switching, is met, it is necessary to detect the possibility of order reversal.

The LMA 3 keeps the state of registration of the MN(2) 2-1, and causes the MAG (1)2-1 to check for the state of the mobile terminal. To this end, the LMA 3 returns an error, using Proxy Binding Acknowledgement (a6 of FIG. 2), and saves the time of receipt T2 and an address of the MAG (1)2-1.

The MAG (1)2-1 detects the state of terminal connection of the MN 1. Here, EAP Request/Identity of the pre-existing EAP (Extensible Authentication Protocol) authentication is used to wait for the response from the MN 1 (a7 and a8 of FIG. 2). If there is no response from the MN 1, the timer is allowed to expire (time-out), so that the processing of the MN 1 comes to a close (a9 of FIG. 2). The state of registration of the MAG (2)2-2 is left in the LMA 3.

FIG. 3 shows the processing for a case where the two registration notification messages have been received with a short time difference therebetween. The processing of FIG. 3 differs from that of FIG. 2 as regards the processing beginning at the time of start of re-authentication. Since the MN 1 is in a connected state, it sends EAP Response/Identity to the MAG (2)2-2 by way of a response (b1 to b9 of FIG. 3).

The MAG (2)2-2 routes EAP success to the MIN 1 (b10 of FIG. 3) to finish the re-authentication (b11 of FIG. 3). The MAG (2)2-2, which succeeded in re-authentication, re-transmits Proxy Binding Update to the LMA 3 (b12 of FIG. 3).

From the address of the MAG (2)2-2, which has been saved, the LMA 3 detects that the Proxy Binding Update is the re-transmission from the MAG (2)2-2. The LMA 3 then registers the MAG (2)2-2 as the access gateway for the MN 1 and saves the time of receipt T3. The state of registration of the MAG (2)2-2 is left in the LMA 3.

If the time difference of receipt of the registration notification messages is longer than a pre-set time, the LMA 3 determines that there is no possibility of order reversal. The LMA 3 thus proceeds to the processing of registration using the new registration notification message.

Thus, in the present exemplary embodiment, each time a registration notification message is received, the time of receipt is recorded. When a new registration notification message is received, the probability of reversal of the order of arrival between the last and new registration notification messages is checked. In a case where the time (difference) between the two messages is longer than the predetermined time, it is determined that no reversal of the order of arrival has occurred. Thus, in the present exemplary embodiment, the above mentioned problem of the related art can be removed by simply adding new functions in the LMA and the MAG 2. Hence, no functions need to be added to the pre-existing mobile terminal (MN1), and simply the time information of the LMA 3 is used, so that there is no necessity of introducing the function of high accuracy time synchronization.

That is, in the present exemplary embodiment, each time a registration notification message is received, the time of receipt thereof is recorded. If the result of comparison of the time of new receipt to that of last receipt indicates that the time difference is shorter than the pre-set time, the probability of order reversal is detected. Viz., no priority is put on any registration notification message simply because the message is a new one. Hence, even if switching is made among three or more MAGs in a short time, it is possible to obviate the problem of reversal of the order of arrival of the registration notification messages.

In the present exemplary embodiment, a decision is given that there is no possibility of order reversal in a case where the difference in the time of receipt is longer than the pre-set period of time. It is thus possible to reduce the overhead of the network designed to obviate the problem of reversal of the order of arrival of the registration notification messages.

In the present exemplary embodiment, simply the addition of functions in the LMA 3 and the MAG 2 is needed, while the pre-existing system as it is may be used insofar as the operation between the MN 1 and the MAG 2 is concerned. It is thus possible to obviate the problem of reversal of the order of arrival of the registration notification messages that may be caused in switching between different MAGs without function addition to the pre-existing mobile terminal (MN 1).

Moreover, in the present exemplary embodiment, only the time information of the LMA 3 is used. It is thus possible to detect the order reversal of the registration notification messages by the LMA 3, which may be caused when the mobile terminal MN 1 switches between different MAGs, without necessitating highly accurate synchronization between the MAGs.

According to the present invention, the above mentioned advantages may be obtained by removing the problems of the proxy mobile IP system relevant to the present invention and, in particular, by comparing the time of receipt of the registration notification messages by the LMA 3, and by checking for the state of terminal connection of the MN 1 at the MAG 2 to determine the order.

Viz., according to the present invention, the LMA 3 detects the possibility of order reversal by recording the time of receipt of the registration notification messages, and by determining whether or not the time difference between the time of receipt of the last message and that of the new message is shorter than the pre-set time interval and whether or not the switching of the MAG2 has been made. According to the present invention, if the possibility of order reversal is detected, it is checked whether or not the mobile terminal (MN 1) has been connected to the new MAG 2, while the current registration of the MAG 2 is maintained. The MAG 2 re-transmits the registration notification message only when the mobile terminal (MN 1) is connected to the MAG 2, thus completing the processing for new registration.

Meanwhile, the terminal connection state acknowledgement unit 24 may also acknowledge the state of the MN 1 using a link layer dependent system. For example, the MAG 2 may have a functional unit cooperating with a base station of a wireless LAN (Local Area Network) to transmit a unicast packet addressed to the MN 1. The possible arrival of the packet at the MAC (Media Access Control) layer of the radio LAN may then be confirmed.

The Proxy Binding Acknowledgement, transmitted from the LMA 3 to the MAG 2 to acknowledge the state of terminal connection of the mobile terminal, may be transmitted as success in registration with Lifetime=0 if there is no assigned special error code. The particular exemplary embodiments or examples may be modified or adjusted within the gamut of the entire disclosure of the present invention, inclusive of claims, based on the fundamental technical concept of the invention. Further, variegated combinations or selections of the elements disclosed herein may be made within the scope of the claims. That is, the present invention may encompass various modifications or corrections that may occur to those skilled in the art within the gamut of the entire disclosure of the present invention, inclusive of claim and the technical concept of the present invention.

Mode 1

In the following, preferred modes are summarized. (refer to the proxy mobile IP (Internet Protocol) system of the first aspect)

Mode 2

The proxy mobile IP system according to mode 1, wherein
the access gateway includes a terminal connection state acknowledging unit detecting the state of connection of the mobile terminal;
the access gateway acknowledging the state of terminal connection of the mobile terminal in case the access gateway has received a notification of acknowledgement of the state of terminal connection from the mobility anchor.

Mode 3

The proxy mobile IP system according to mode 2, wherein
the terminal connection state acknowledging unit detects a response of the mobile terminal using EAP Request/Identity of EAP (Extensible Authentication Protocol) authentication and, based on the result of the detection, detects the connection state of the mobile terminal.

Mode 4

The proxy mobile IP system according to any one of modes 1 to 3, wherein
if the receipt time difference of the registration notification messages is longer than the pre-set period of time, the mobility anchor determines that there is no possibility of order reversal and performs the processing for the proxy mobile IP registration using the new registration notification message.

Mode 5

An access gateway, comprising:
a terminal connection state acknowledging unit detecting the state of connection of a mobile terminal;
the access gateway acknowledging the state of terminal connection of the mobile terminal when the access gateway has received a notification of acknowledgement of the state of terminal connection from the mobility anchor.

Mode 6

The access gateway according to mode 5, wherein
the terminal connection state acknowledging unit detects a response of the mobile terminal, using EAP Request/Identity of EAP (Extensible Authentication Protocol) authentication and, based on the result of detection, detects the state of connection the mobile terminal.

Mode 7

A mobility anchor, comprising:
a proxy mobile IP registration unit effectuating proxy mobile registration in proxy mobile IP (Internet Protocol) communication by one or more registration notification messages from an access gateway; and
a last registration time recording/management unit recording and managing the time of last registration by the registration notification message;
the mobility anchor, on receipt of a new registration notification message, determining, in case a receipt time difference or a receipt time interval between the time of receipt of the new registration notification message and a registration notification message recorded last time in the last registration time recording/management unit is within a pre-set period of time and the access gateway has changed by switching, possibility of order reversal of the new registration notification message and the registration notification message recorded last time.

Mode 8

The mobility anchor according to mode 7, wherein if the receipt time difference between the new registration notification message and the registration notification message recorded last time is longer than the pre-set period of time, the mobility anchor determines that there is no possibility of order reversal, and proceeds to processing of the proxy mobile IP registration using the new registration notification message.

Mode 9 (refer to the method for determining the order of one or more registration notification messages of the second aspect)

Mode 10

The method for determining the order of registration notification messages according to mode 9, wherein
if a notification of acknowledgement of the state of terminal connection is received from the mobility anchor, the terminal connection state acknowledging unit of the access gateway, for detecting the state of connection of the mobile terminal, acknowledges the state of terminal connection of the mobile terminal.

Mode 11

The method for determining the order of registration notification messages according to mode 10, wherein the access gateway detects a response of the mobile terminal, using EAP Request/Identity of EAP (Extensible Authentication Protocol) authentication and, based on the result of detection, detects the state of connection of the mobile terminal.

Mode 12

The method for determining the order of registration notification messages according to any one of modes 9 to 11, wherein if the receipt time difference of the registration notification messages is longer than the pre-set period of time, the mobility anchor determines that there is no possibility of order reversal and performs a processing for the proxy mobile IP registration using the new registration notification message.

Mode 13

A proxy mobile IP system in which a mobility anchor determines the order of one or more registration notification messages from an access gateway in proxy mobile IP (Internet Protocol) communication that manages location of a mobile terminal over a communication network; wherein the mobility anchor includes a last registration time recording/management unit recording/managing a time of last registration by the registration notification message; the last registration time recording/management unit working in association with a proxy mobile IP registration unit configured to effectuate proxy mobile IP registration in the proxy mobile IP communication by the registration notification message;

the mobility anchor, on receipt of a new registration notification message, determining, in case a receipt time difference (or a receipt time interval) between a time of receipt of the new registration notification message and a time of receipt of a registration notification message recorded last time in the last registration time recording/management unit is within a pre-set period of time and the access gateway has changed by switching, possibility of reversal of the order of the new registration notification message and the registration notification message recorded last time.

Mode 14

For use in a proxy mobile IP (Internet Protocol) system in which a mobility anchor determines order of one or more registration notification messages from an access gateway in proxy mobile IP communication that manages location of a mobile terminal over a communication network, a method for determining the order of the registration notification messages, comprising:

a providing the mobility anchor with a last registration time recording/management unit recording/managing a time of last registration by the registration notification message; the last registration time recording/management unit working in association with a proxy mobile IP registration unit configured to effectuate proxy mobile IP registration in the proxy mobile IP communication by the registration notification message;

the mobility anchor, on receipt of a new registration notification message, determining, in case a receipt time difference (or a receipt time interval) between a time of receipt of the new registration notification message and a time of receipt of the registration notification message recorded last time in the last registration time recording/management unit is within a pre-set period of time and the access gateway has changed by switching, possibility of reversal of the order of the new registration notification message and the registration notification message recorded last time.

Mode 15

The proxy mobile IP system according to mode 2, wherein the access gateway re-transmits a registration notification message in case the terminal connection state acknowledging unit has detected the state of terminal connection of the mobile terminal.

Mode 16

The access gateway according to mode 5, wherein the access gateway re-transmits a registration notification message in case the terminal connection state acknowledging unit has detected the state of terminal connection of the mobile terminal.

Mode 17

The method for determining the order of registration notification messages according to mode 10, wherein a registration notification message is re-transmitted when the state of terminal connection of the mobile terminal is detected by the terminal connection state acknowledging unit.

What is claimed is:

1. A proxy mobile IP system, in which a mobility anchor comprises:

a proxy mobile IP registration unit effectuating proxy mobile IP registration in proxy mobile IP (Internet Protocol) communication by a plurality of registration notification messages from an access gateway; and a last registration time recording/management unit effectuating recording and management of time of last registration by a first registration notification message of the plurality of registration notification messages; wherein said mobility anchor, on receipt of a second registration notification message of the plurality of registration notification messages, determines, in case a receipt time difference or a receipt time interval between the time of receipt of said second registration notification message and said first registration notification message recorded last time in said last registration time recording/management unit is within a pre-set period of time, and said access gateway has changed by switching, possibility of order reversal of said second registration notification message and said first registration notification message recorded last time.

2. The proxy mobile IP system according to claim 1, wherein said access gateway includes terminal connection state acknowledging unit detecting the state of connection of said mobile terminal;

said access gateway acknowledging the state of terminal connection of said mobile terminal in case said access gateway has received a notification of acknowledgement of the state of terminal connection from said mobility anchor.

3. The proxy mobile IP system according to claim 2, wherein said terminal connection state acknowledging unit detects a response of said mobile terminal using EAP Request/Identity of EAP (Extensible Authentication Protocol) authentication and, based on the result of the detection, detects the connection state of said mobile terminal.

4. The proxy mobile IP system according to claim 1, wherein if said receipt time difference is longer than said pre-set period of time, said mobility anchor determines that there is no possibility of order reversal and performs the processing for said proxy mobile IP registration using said second registration notification message.

5. A mobility anchor, comprising:
a proxy mobile IP registration unit effectuating proxy mobile registration in proxy mobile IP (Internet Protocol) communication by a plurality of registration notification messages from an access gateway; and
a last registration time recording/management unit recording and managing the time of last registration by a first registration notification message of the plurality of registration notification messages;
said mobility anchor, on receipt of a second registration notification message of the plurality of registration notification message, determining, in case a receipt time difference or a receipt time interval between the time of receipt of said second registration notification message and said first registration notification message recorded last time in said last registration time recording/management unit is within a pre-set period of time and said access gateway has changed by switching, possibility of order reversal of said second registration notification message and said first registration notification message recorded last time.

6. The mobility anchor according to claim 5, wherein if said receipt time difference is longer than said pre-set period of time interval, the mobility anchor determines that there is no possibility of order reversal, and proceeds to processing of said proxy mobile IP registration using said second registration notification message.

7. A method for determining order of a plurality of registration notification messages from an access gateway, wherein
when a proxy mobile IP registration in proxy mobile IP (Internet Protocol) communication is to be effectuated by a first registration notification message of the plurality of registration notification messages from said access gateway, time of receipt of said first registration notification message is recorded by a mobility anchor; and
on receipt of a second registration notification message of the plurality of registration notification messages, possibility of order reversal of said second registration notification message and said first registration notification message recorded last time is determined in case a receipt time difference or a receipt time interval between the time of receipt of said second registration notification message and the time of receipt of said first registration notification message recorded last time is within a pre-set period of time and said access gateway has changed by switching.

8. The method for determining the order of registration notification messages according to claim 5, wherein
if a notification of acknowledgement of the state of terminal connection is received from said mobility anchor, said terminal connection state acknowledging unit, of said access gateway, for detecting the state of connection of said mobile terminal, acknowledges the state of terminal connection of said mobile terminal.

9. The method for determining the order of registration notification messages according to claim 8, wherein
said access gateway detects a response of said mobile terminal, using EAP Request/Identity of EAP (Extensible Authentication Protocol) authentication and, based on the result of detection, detects the state of connection of said mobile terminal.

10. The method for determining the order of registration notification messages according to claim 7, wherein
if the receipt time difference is longer than said pre-set period of time, said mobility anchor determines that there is no possibility of order reversal and performs a processing for said proxy mobile IP registration using said new registration notification message.

11. The proxy mobile IP system according to claim 2, wherein
said access gateway transmits a third registration notification message of the plurality of registration notification messages in case said terminal connection state acknowledging unit has detected the state of terminal connection of said mobile terminal.

12. The method for determining the order of registration notification messages according to claim 8, wherein
a third registration notification message of the plurality of registration notification messages is transmitted when the state of terminal connection of said mobile terminal is detected by said terminal connection state acknowledging unit.

* * * * *